(12) United States Patent
Moses

(10) Patent No.: US 7,331,139 B2
(45) Date of Patent: Feb. 19, 2008

(54) COLLAPSIBLE FISHING POLE HOLDER

(76) Inventor: Washington Moses, 10490 Willow Meadow Cir., Alpharetta, GA (US) 30022

(*) Notice: Subject to any disclaimer, the term of this patent is extended or adjusted under 35 U.S.C. 154(b) by 55 days.

(21) Appl. No.: 10/972,607

(22) Filed: Oct. 25, 2004

(65) Prior Publication Data
US 2006/0086883 A1 Apr. 27, 2006

(51) Int. Cl.
A01K 97/10 (2006.01)

(52) U.S. Cl. .............. 43/21.2; 43/17; 248/519; 211/70.8

(58) Field of Classification Search ........ 248/150, 248/151, 156, 406.2, 165, 166, 176.1, 187.1, 248/519, 528, 529, 530, 533; 43/21.2, 54.1, 43/17; 211/70.8
See application file for complete search history.

(56) References Cited

U.S. PATENT DOCUMENTS

| | | | | |
|---|---|---|---|---|
| 567,084 A * | 9/1896 | Eicher | | 248/517 |
| 1,091,491 A * | 3/1914 | Ebur | | 248/515 |
| 2,127,790 A * | 8/1938 | Smoot | | 248/533 |
| 2,466,166 A * | 4/1949 | Fischer | | 248/533 |
| 2,926,874 A * | 3/1960 | Hahn | | 248/514 |
| 3,835,568 A * | 9/1974 | Whitfield | | 43/17 |
| 3,945,143 A * | 3/1976 | Schmitt, Sr. | | 43/21.2 |
| 4,063,704 A * | 12/1977 | Rother | | 248/515 |
| 5,014,458 A * | 5/1991 | Wagner | | 43/21.2 |
| 5,501,028 A * | 3/1996 | Hull et al. | | 43/17 |
| 5,557,877 A * | 9/1996 | Colson | | 43/21.2 |
| 5,685,107 A * | 11/1997 | Sweet | | 43/21.2 |
| 5,860,534 A * | 1/1999 | Minneman et al. | | 211/13.1 |
| 5,987,804 A * | 11/1999 | Shearer et al. | | 43/21.2 |
| 6,289,627 B1 * | 9/2001 | Gibbs et al. | | |
| 6,338,465 B1 * | 1/2002 | Stoner | | 248/530 |
| 6,341,443 B1 * | 1/2002 | Watford et al. | | 43/17 |
| 2005/0178041 A1 * | 8/2005 | Zaffiro | | 43/21.2 |

* cited by examiner

Primary Examiner—A. Joseph Wujciak, III

(57) ABSTRACT

A collapsible fishing pole holder that provides enhanced performance characteristics for holding multiple fishing poles. A collapsible fishing pole holder includes an adjustable vertical member and horizontal member having a plurality of adjustable clamps, a panel member, an indicator for alerting user of a line catch and an attachment member for securing holder to a base.

18 Claims, 7 Drawing Sheets

COLLAPSIBLE FISHING POLE HOLDER

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF INVENTION

1. Technical Field

The present invention relates generally to an enhanced fishing pole holder. More particularly, the invention relates to a collapsible and adjustable fishing pole holder for securely holding a plurality of fishing poles.

2. Description of the Related Art

Several types of fishing pole holders are available in the prior art and are utilized by users for several different purposes during fishing. There are a number of devices that can be used for fishing on land or sea. For instance, a number of devices allow the user to fish without having to hold the fishing pole his or herself. Specifically, in U.S. Pat. No. 5,383,299 to Smelker, a device is disclosed for holding two fishing poles simultaneously comprising a vertical positionably post. The device includes a lower end insertable into the ground. Additionally, the device includes a power source and a noise emitter to provide an alarm for a fish that is biting. While the device disclosed in Smelker can be an adequate solution for the basic purpose and function for which it had been specifically designed, the Smelker device is deficient with respect to its failure to provide the most efficient and convenient device for securely holding multiple fishing poles on various types of terrain while fishing.

The need for a structural design that is simple to assemble, while also providing secure attachments for multiple fishing poles onto a fishing pole holder is necessary for any suitable device. However, most prior art devices do not provide the most suitable design for securely holding multiple fishing poles and are difficult to use. Additionally, many devices in the prior art can be difficult to assemble. For example, U.S. Pat. No. 6,341,443 B1 to Watford discloses a fishing stand used to support at least one fishing rod that provides an audible and/or visible signal when a fish strikes. The device includes a T-shaped apparatus with a tripod base used to hold the apparatus and rod(s) on any type of terrain. The Watford device allows the user to support at least one fishing rod, however the tripod base of the Watford device does not seem to provide the most efficient device for mounting on different types of surfaces, as the tripod base is most suitable for only flat surfaces.

The vast majority of fishing pole holder devices are primarily constructed to attach a fishing pole to a fishing pole holder and do not provide for easy adjustment of the pole after it is attached to the fishing pole holder. The inability to adjust fishing rods after attachment can cause difficulty to many users, as many users have to make additional adjustments while utilizing a fishing pole holder. Several fishing pole holders available in the prior art utilize fishing line that often becomes tangled to the holder and experiences severe line breakage. There exists a need for a fishing pole holder that allows a fishing pole to be adjusted after attachment of multiple fishing poles to a holder.

A fishing pole holder should be simple and unproblematic to use. A fishing pole holder should be easily assembled and disassembled for packaging and storage. In addition, a fishing pole holder should allow a user to securely attach several fishing poles to a single fishing pole holder without difficulty. The fishing pole holder should be economical and be constructed from lightweight material to allow the user to easily assemble and maneuver the device during actual use. The device should be constructed from a material, such as plastic, a lightweight metal, or other suitable combination.

Many fishing pole holders available in the prior art do not effectively allow a user to attach and detach his fishing pole during usage, and may become inefficient due to normal wear and tear. Additionally, most fishing pole holders include component members that do not permit a pole to be adjusted after a pole is attached to the holder. Several fishing pole holders in the prior art include members that are unable to be broken down into smaller components. Accordingly, there exists a need for a collapsible fishing pole holder that can securely hold multiple fishing poles, while allowing the poles to remain easily detachable and adjustable for packaging and handling.

SUMMARY OF INVENTION

The present invention relates to a collapsible fishing pole holder with enhanced performance characteristics. More particularly, the present invention provides a fishing pole holder for holding multiple fishing poles, while also providing the ability to adjust each pole attached to the holder. The present invention also provides a holder that can be assembled and dissembled with the expenditure of little time and effort. The invention provides a lightweight holder that can be maneuvered and used by a variety of individuals while fishing on land or sea.

According to the invention, a fishing pole holder can comprise a support bar having collapsible members. The component members of the support bar include a horizontal member and a vertical member. The horizontal member and the vertical member can be detachably connected to form a T-shaped support bar. The horizontal member includes a plurality of open spaces. The horizontal member can be further engaged to a plurality of clamps. The clamps can be attached to open spaces located on the horizontal member. The clamps can include a first end and a second end for receiving a fishing pole. The horizontal member can include at least one panel member for receiving an indicator means.

The horizontal member and the vertical member can include a connection structure. The vertical member can be detachably coupled to the horizontal member to form a support bar. The vertical member can include a joint member to adjust the height of the fishing pole holder. The vertical member can include an attachment means for attaching the collapsible support bar to a base. The fishing pole holder includes an indicator attached to the vertical member or the horizontal member.

The present invention can be utilized on several types of surfaces, such as land or sea. Several variations of the component members can be configured and easily assembled to customize the holder based on the location of the desired use. For instance, a pointed pole can be used as an attachment means on soft surfaces, such as land. Alternatively, a clamp can be used as an attachment means to attach the holder to the side of a boat while at sea.

The invention provides clamps that can be easily removed or attached to allow a user to customize the holder for his or her particular fishing needs. The clamps can be coupled to various configurations and is not limited to any particular design. A user can easily detach and attach clamps depending on the specific use and purpose of the user. One particular example of a suitable configuration includes a configuration having four clamps detachably coupled at four separate open spaces along the horizontal member of the support bar. In another example, instead of attaching multiple clamps, a user can elect to attach only one clamp to an open space to adequately suit his particular fishing needs. The configuration of the open spaces provides the horizontal member and attached clamps with equalized load support across the surface of the horizontal member. The configuration of the open spaces also provides increased stability against horizontal and vertical forces that effectively minimize wear and tear on the fishing pole holder. Minimizing normal wear and tear extends the life of the fishing pole holder.

According to the invention, the clamps can be further utilized to securely hold a fishing pole into place after it is secured to the holder. The clamp holds the pole securely, however, the clamps can be adjusted after a fishing pole is attached. For instance, a user can simply adjust the nut and bolt assembly and readjust the clamp to a desired position. The adjustability of the clamps allow the user to secure the pole and subsequently make any incremental angle adjustments that the user may need to fish in certain conditions. For example, a user can attach two fishing poles to separate clamps located on the holder, and subsequently make an individual adjustment to the first clamp of ten (10) degrees, while making a twenty (20) degree adjustment to a second clamp.

The invention can be packaged as a kit, where the kit includes the individual components of the fishing pole holder in combination with a suitable fishing pole, fishing line, and other accessories that compliment the effective operation of the holder. The invention can include other combinations of components to suit the fishing needs of the particular user. For example, the invention can include a combination of indicators, such as a visual alarm and rod bell, which emit light rays and ringing bell tones to indicate that a fish is attached to the corresponding fishing line. For packaging and handling purposes, the invention should be constructed from a lightweight material to increase handling and maneuvering by the user when assembling and disassembling the holder.

BRIEF DESCRIPTION OF THE DRAWINGS

The invention may be better understood by referring to the following description taken in conjunction with the accompanying drawings, it being understood, however, that the invention is not limited to the precise arrangements and instrumentalities shown.

DETAILED DESCRIPTION OF THE PREFERRED EMBODIMENTS

The present invention provides a fishing pole holder 10 with enhanced physical properties. The invention provides a fishing pole holder 10 comprised of a plurality of clamps and detachable support bar assembly that provides increased durability while fishing. The present invention also includes a fishing pole holder 10 that can be easily assembled and disassembled while providing convenience and flexibility to the user. Although the illustrations provided herewith depict the present invention in specific embodiments, it is understood that the illustrations are intended to be for illustrative purposes only. Accordingly, it is understood that the invention can exist in several embodiments.

Figure 1:
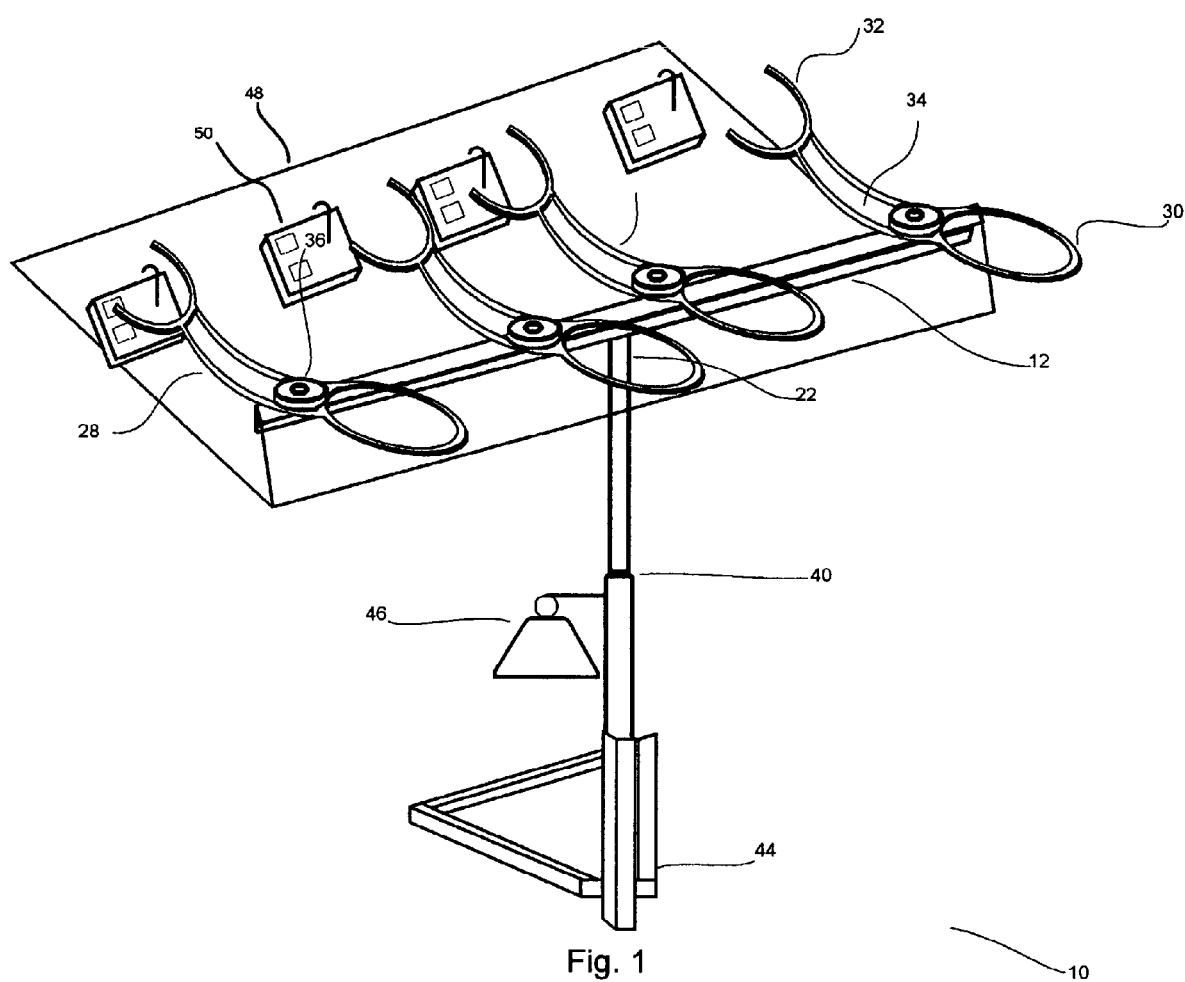
FIG. 1 shows a perspective view of a collapsible fishing pole holder having a panel member with a plurality of indicator means.

According to the embodiment of invention depicted in FIG. 1, a fishing pole holder 10 can comprise a support bar. The support bar of the holder 10 can be collapsible and can include a horizontal member 12 and a vertical member 16. The horizontal member 12 can include a plurality of open spaces 14. The horizontal member 12 also can include a plurality of clamps. The clamps can be attached to the open spaces 14 located on the horizontal member 12 of the holder 10. The clamps can include a first end 30 and a second end 32 for receiving a fishing pole. At least one of the horizontal member 12 and the vertical member 16 can include a connection structure 22 for attaching the vertical member 16 to the horizontal member 12. The vertical member 16 can include a joint member 40 to adjust the height of the fishing pole holder 10. The vertical member 16 can include an attachment means 44 for removably attaching the collapsible support bar to a secure base. The fishing pole holder 10 can provide an indicator 46 attached to at least one of the vertical member 16 and the horizontal member 12.

As depicted in FIG. 1, the support bar can be constructed having a vertical member 16 and a horizontal member 12 attached to form a T-shaped support bar. The horizontal member 12 and the vertical member 16 provide a multiple layered fishing pole holder 10 with added durability and load support. The T-shaped support bar provides increased strength for the fishing pole holder 10. The vertical member 16 can be detachably coupled to the horizontal member 12 using a connection structure 22.

Figure 2:
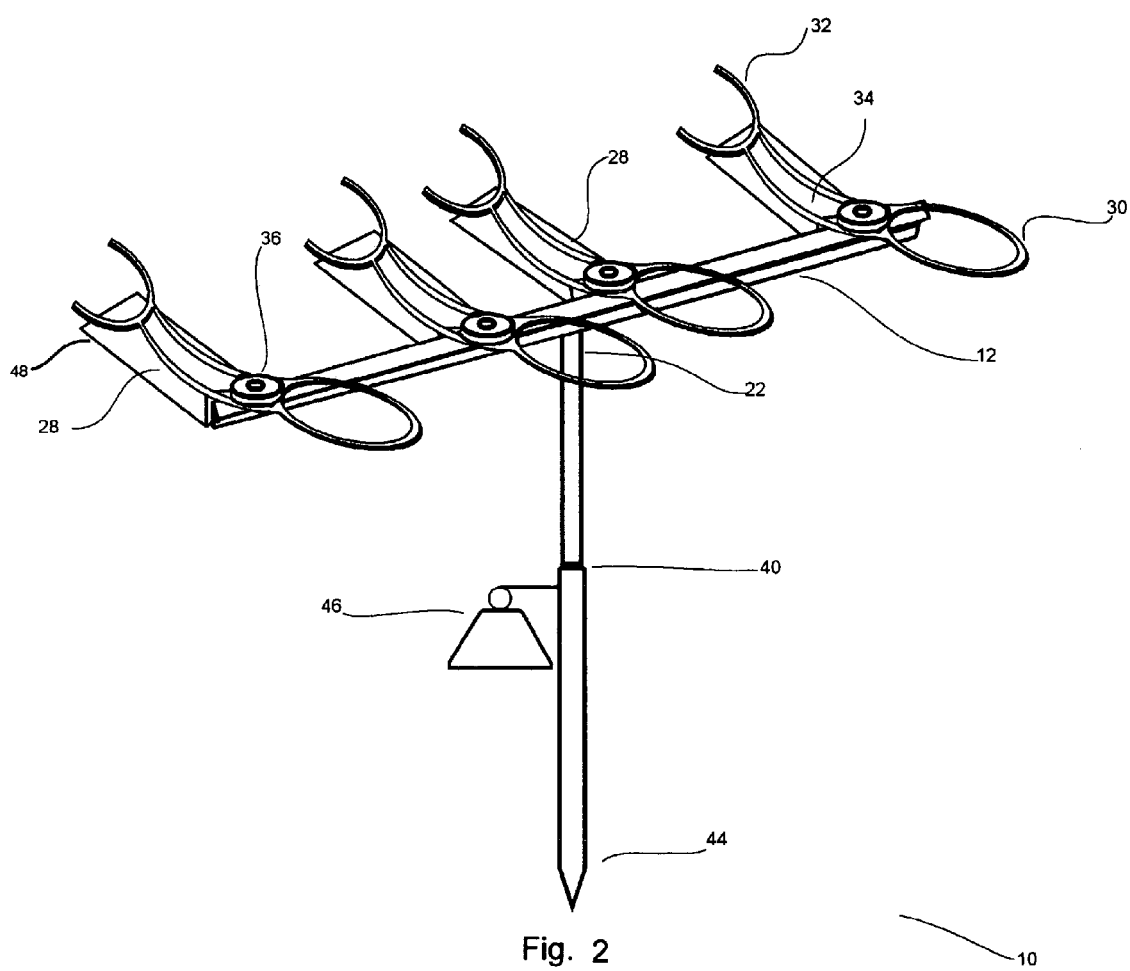
FIG. 2 shows a perspective view of a collapsible fishing pole holder having a plurality of panel members.

The connection structure 22 can include a screw, snap or groove. For example, the connection structure 22 can include a first end 24 and a second end 26. The first end 24 of the connection structure 22 can provide male threads, while the second end 26 can provide female threads. The opposing threads located on the first end 24 and second end 26 of the connection structure 22 can be joined to provide a connection means for the connection structure 22. In this particular embodiment of the present invention illustrated in FIG. 2, the connection structure 22 can be screwed utilizing the opposing grooves on the connection member, similar to screwing a lid on ajar. Alternatively, a connection structure 22 can be constructed utilizing a snap, wherein the opposing ends of the connection structure are snapped into place. The connection structure 22 allows the holder 10 to be easily assembled when a user is ready to use the holder 10. Conversely, the connection structure 22 allows the holder 10 to be quickly disassembled after fishing is complete. The connection structure 22 allows the major components of the fishing pole holder 10 to be easily detached and packed for storage purposes.

Figure 5:
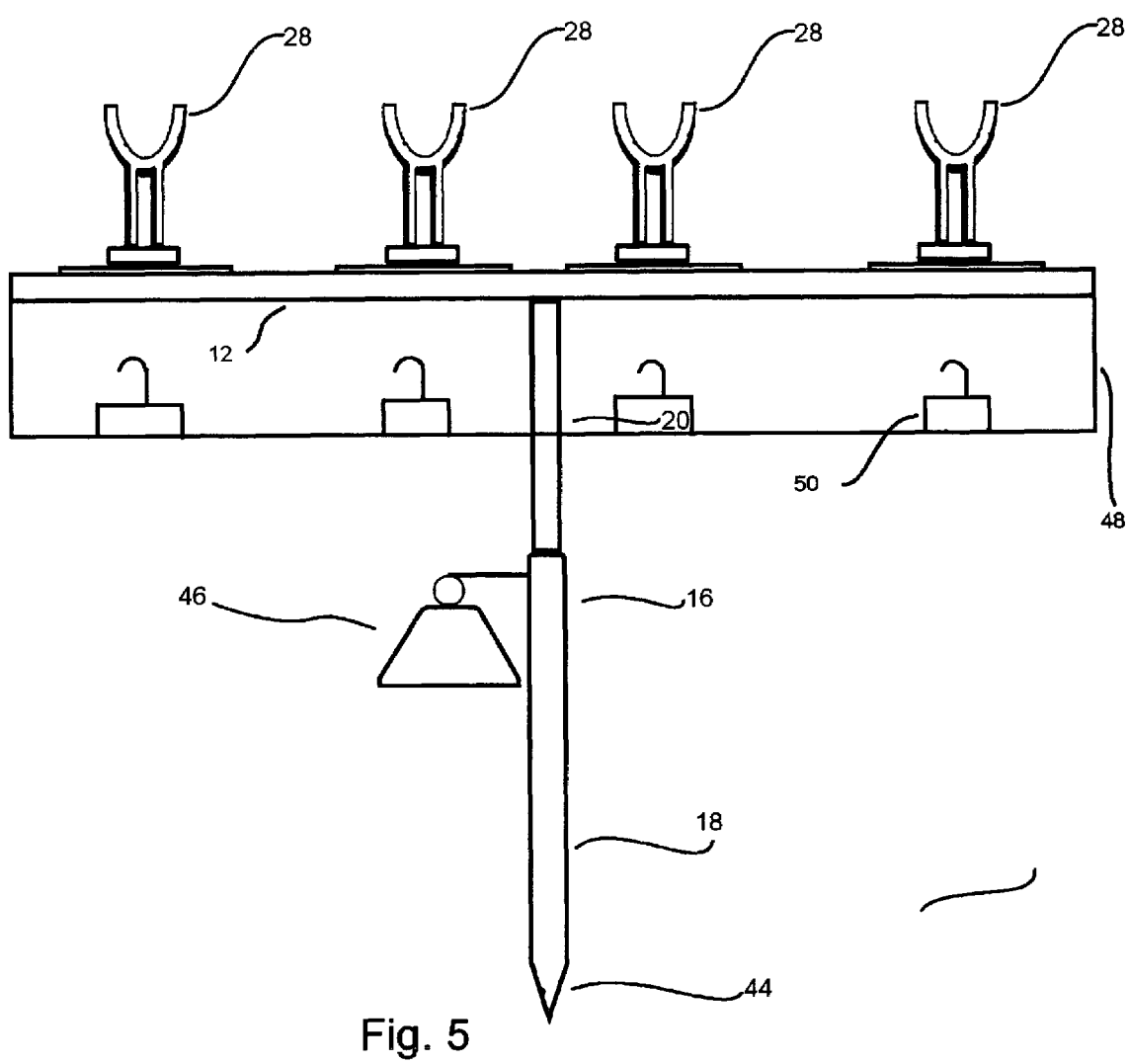
FIG. 5 shows a front view of a collapsible fishing pole holder with a panel member with a plurality of indicator means attached to panel member and vertical member.

As shown in FIG. 1 and FIG. 5, the fishing pole holder 10 can include a plurality of clamps. The clamps can include a first end 30 and a second end 32. The first end 30 of the clamp can include a closed end to secure the handle of an attached fishing pole. The second end 32 can include a hook end to receive the body of an attached fishing pole. The closed end allows the lower end of a fishing pole to be secured once it is placed in the circular closed end of the clamp. The hook end is formed in the shape of a semi-circle and provides additional support to the fishing pole as it extends outward. Additionally, the hook end prevents the pole from moving after the pole has been secured to the holder 10.

The clamp includes a longitudinal channel 34 located between the first end 30 and second end 32 of the clamp. The longitudinal channel 34 provides a pathway between the ends of the clamp while also providing an attachment point for a nut 36 and bolt 38 assembly. The bolt 38 can include a first end and an opposite end. The bolt 38 can extend through the open pathway of the longitudinal channel 34 having a nut 36 attached to the opposite end of the bolt 38. The assembly can also include a washer to further assist in securing the clamp to the support bar. The nut 36 and bolt 38 assembly allows the clamp to be detached by simply unscrewing the nut 36 from the bolt 38, thereby providing easy assembly and disassembly.

The clamps can be maneuvered to make position adjustments during actual use. The nut 36 and bolt 38 assembly permit the clamps to be rotated from 0 to 360 degrees about the axis of the bolt 38. For example, the nut 36 can be partially unscrewed from the bolt 38 to allow the clamp to be rotated at various angles before use or during use. Thereby, allowing the fishing pole to be positioned at different angles that may provide better results during fishing.

As illustrated in FIG. 5, multiple clamps can be attached to the surface of the horizontal member 12. The placement and orientation of the clamps can vary depending on the particular placement of the clamps by the user. The horizontal member 12 can include a plurality of open spaces 14. The clamps can be attached to any open space located on the horizontal member 12. The open spaces 14 can be spaced at intervals along the surface of the horizontal member 12 to provide adequate space and separation to the multiple clamps detachably coupled to the horizontal member 12. The open spaces 14 can also be spaced to provide overall balance to the holder 10 during use. The open spaces 14 can be arranged in a periodic relationship across the surface of the horizontal member 12 and each open space can provide an attachment point for a clamp. The open spaces 14 provide additional stability within the particular design of the fishing pole holder 10. The geometry of the open spaces 14 incorporated into the surface of the horizontal member 12 can include several variations. The geometric arrangement of the open spaces 14 across the horizontal member 12 supports the stability and strength of the design of the fishing pole holder 10.

Figure 4:
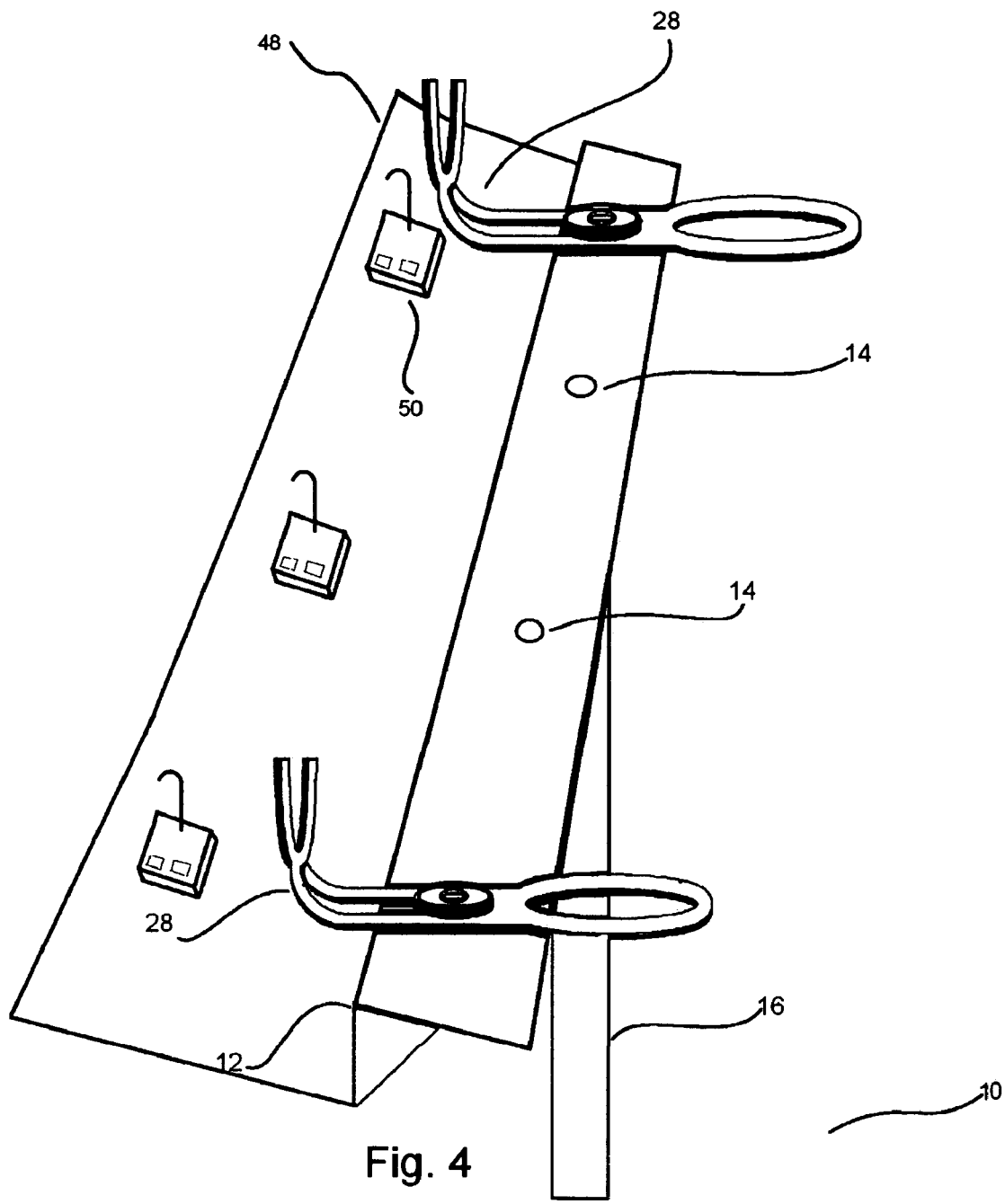
FIG. 4 shows a perspective view of a collapsible fishing pole holder having a panel member with a plurality of indicator means.

In the present invention, the clamps can be easily removed or attached to allow a user to customize the holder 10 for his or her particular fishing needs. The configuration of the clamps is not limited to any particular design and can be arranged in a suitable configuration based on the specific use and purpose of the user. One particular example of a suitable configuration includes a configuration having four clamps detachably coupled at four separate open spaces 14 along the horizontal member 12 of the support bar, as illustrated in FIG. 4. In another example, instead of attaching multiple clamps, a user can elect to attach only one clamp to an open space to adequately suit his particular fishing needs. The configuration of the open spaces 14 provides the horizontal member 12 and attached clamps with equalized load support across the surface of the horizontal member 12. The configuration of the open spaces 14 also provides increased stability against horizontal and vertical forces that effectively minimize wear and tear on the fishing pole holder 10. Minimizing normal wear and tear extends the life of the fishing pole holder 10.

FIG. 5 illustrates the vertical member 16 of the support bar. The vertical member 16 can include a lower end 18 and an upper end 20. In this embodiment, the vertical member 16 includes an attachment means 44 located at the lower end 18. The attachment means 44 can stabilize the fishing pole holder 10 while the user is utilizing the holder 10. The attachment means 44 allow the fishing pole holder 10 to be inserted into a beach, clamped onto a boat, or mounted onto any structure. An attachment means can secure the fishing pole holder 10 in a stationary position relative to the beach, boat, or structure. The attachment means 44 depicted in this embodiment includes a pointed rod. The rod has a sharp and pointed edge that allows the fishing pole holder 10 to be inserted into surfaces, such as land. The attachment means 44 also can include other suitable means, such as a clamp or stand. For instance, a user can attach a clamp to the lower end 18 of the vertical member 16 that allows the holder 10 to be attached to a side of a boat or other non-flat surface. The attachment means 44 can be easily interchanged depending on the particular needs of the user.

Figure 6:
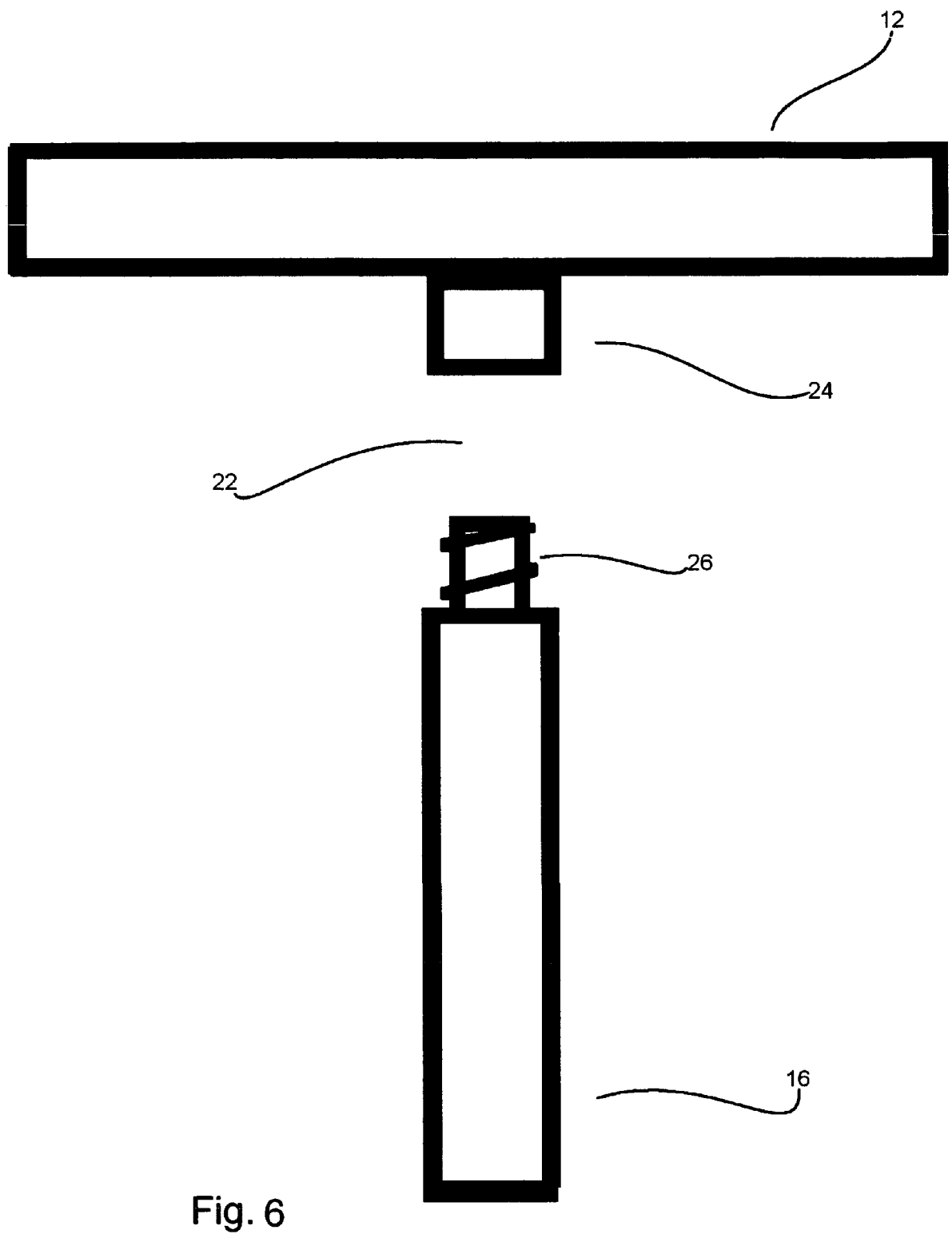
FIG. 6 shows a front sectional view of a vertical member attached to a horizontal member with a connection structure.
Figure 7:
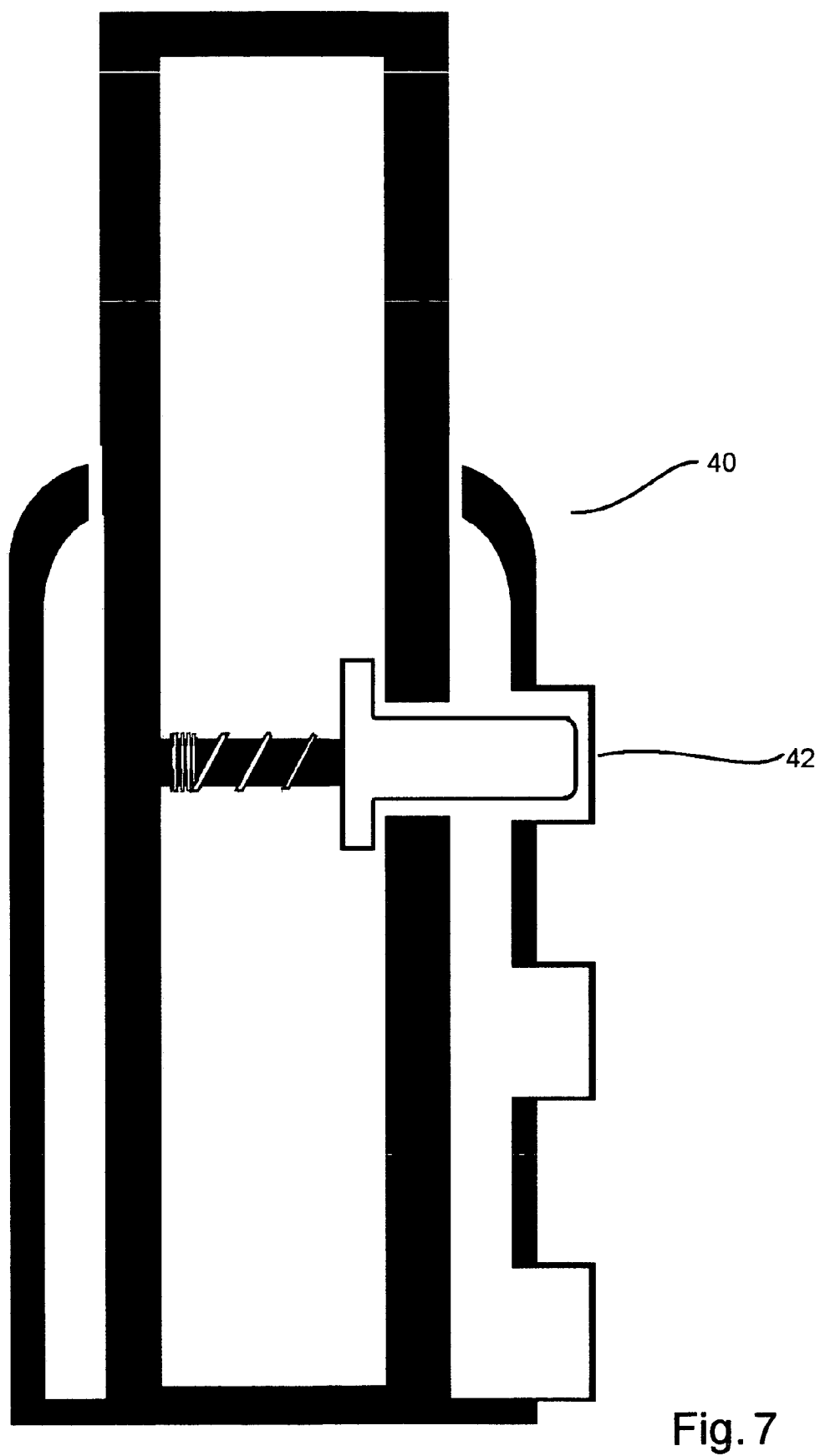
FIG. 7 shows a front sectional view of a screw attached to a vertical member of a fishing pole holder.

FIG. 5 and FIG. 6 further illustrate the joint member 40 attached to the vertical member 16. The joint member 40 can be adjusted to change the height of the fishing pole holder 10. For instance, the user can loosen the screw 42 of the joint member 40 and adjust the height of the vertical member 16 to a suitable position. After loosening the screw 42, the user can apply a small amount of pressure to the upper end 20 or lower end 18 of the vertical member 16 to re-adjust the height. The vertical member 16 can be secured at the new location by simply tightening the screw 42. The joint member 40 can also be completely detached and utilized to separate the vertical member 16 into separate members for packaging. In an alternate embodiment of the present invention, a joint member 40 can be attached to the horizontal member 12 of the support bar to adjust the length of the bar. The joint member 40 can also include a tilt mechanism to allow the vertical member 16 or the horizontal member 12 to be adjusted at a tilted angle to suit the needs of the user.

In one embodiment of the present invention, a fishing pole holder 10 can include an indicator 46 attached to the vertical member 16 or horizontal member 12 of the support bar. The indicator 46 can include an audible alarm or a visual alarm. For example, the indicator 46 can include an audible alarm such as a rod bell, attached to the vertical member 16 of the support bar. The rod bell can ring if the fishing line is moved indicating that a fish is attached to the line. The indicator 46 can include a visual alarm, such as a light, wherein the light emits rays to indicate that a fish is attached to the fishing line. The indicator 46 can also include a combination of a visual alarm and audible alarm. For instance, flashing lights and a bell alarm can ring to notify a user that the fishing pole holder 10 and attached line has successfully caught a fish.

Figure 3:
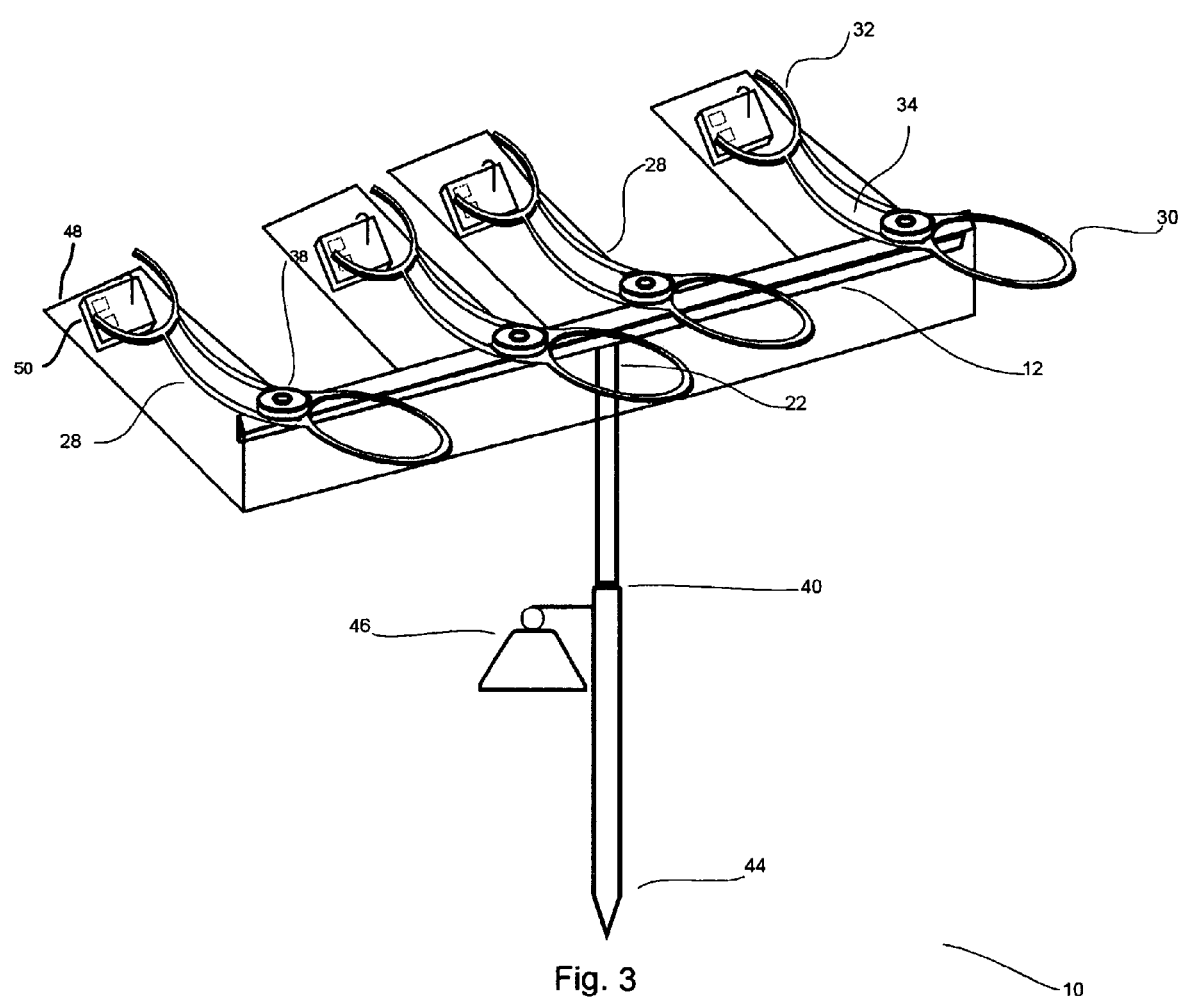
FIG. 3 shows a perspective view of a collapsible fishing pole holder with a plurality of panel members with a plurality of indicator means.

As depicted in FIG. 1, one embodiment of the present invention can include a panel member 48. The panel member can be detachably coupled to the horizontal member 12 of the support bar. The panel member 48 can include a first surface and an opposite surface. An indicator means 50 can be attached to any surface of the panel member. As illustrated in the FIG. 1 and FIG. 2, the panel member can be in the form of a sheet or can include a plurality of panel members 48. Each panel member 48 can also include an indicator means 50 in the form of an alarm. For example, FIG. 3 illustrates a plurality of detachable panel members 48 positioned in a plane parallel to each clamp 28 located on the horizontal member 12 of the support bar. An alarm can be positioned on each panel member 48. The indicator means 50 of the alarm can include a combination of a visual alarm and an audible alarm. The square-shaped windows of the indicator means 50 allow the alarm to show flashing lights or other visual alert. Additionally, the alarm can include a hook. The hook can be engaged to a fishing line to trigger the alarm thereby indicating to a user that a fish is attached to the line. In one example of the invention, the indicator device having a hook can be attached to the eye of the fishing pole. As depicted in FIG. 1, the alarm can be in the shape similar to that of a matchbox, thereby allowing the alarm to be securely attached at any point on the surface of the panel member 48 or along the surface of the support bar.

In a preferred embodiment of the present invention, the fishing pole holder 10 has a height of 5.0 feet, a length of 2.5 feet, and a width of 1.25 feet. Additionally, the holder 10 will include components that can be detached and attached easily for packaging and shipping purposes. The fishing pole holder 10 should be constructed from a lightweight material to increase handling and maneuvering by the user when assembling the holder 10.

The horizontal member 12 and vertical member 16 of the fishing pole holder 10 can be composed of a variety of materials such as wood, plastic, particle board and metal. The components of the fishing pole holder 10 are not limited to a particular type of material for construction, although attention to design structure and intended use should be factors to consider. The fishing pole holder 10 also can be formed by the intermingling of different materials including gases, minerals, and plastics. For example, a composition of plastics and polymers that maintain high durability may be suitable.

The detachable components of the fishing pole holder 10, such as the detachable clamps and detachable support bar, provide an increased holding capacity for securing and holding a plurality of fishing poles. Additionally, the fishing pole holder 10 can be assembled in an efficient manner while also providing the individual components, such as the horizontal member 12 and vertical member 16, that can be broken down into smaller units with collapsible members. The members can then be safely stored and handled during periods of non-use. The fishing pole holder 10 can be packaged as a kit, where the kit includes the individual components of the fishing pole holder 10 in combination with a suitable fishing pole, fishing line, and other accessories that compliment the effective operation of the holder 10.

It will of course be understood that the invention is not limited to the specific details described herein, which are given by way of example only, and that various modifications and alterations are possible within the scope of the invention as defined in the appended claims. For example, the horizontal member 12 can include variations in the number of clamps, configurations of open spaces 14, and types of attachment means 44, and remain within the scope of the invention.

What is claimed:

1. A fishing pole holder comprising:
   a collapsible support bar having a vertical member and a horizontal member;
   said horizontal member having a plurality of open spaces;
   a plurality of clamps attached to said open spaces of said horizontal member, wherein said clamps include a first end and a second end to receive a handle of a fishing pole;
   at least one panel member attached to said horizontal member, wherein the at least one panel member comprises a sheet of material having a first surface and an opposite surface extending in a parallel plane proximal to at least one of the first end and second end of the plurality of clamps, wherein an indicator means for indicating to a user that a fish is attached to a line of fishing pole, is attached to the first surface of the at least one panel member proximal to at least one of the first end and second end of the plurality of clamps to provide notification to a user of a fish secured to said fishing pole said indicator means comprising visual alarm or audio alarm;
   a connection structure for attaching said vertical member to said horizontal member of said support bar;
   a joint member attached to said vertical member for adjusting height of said vertical member; and
   an attachment member for removably attaching said vertical member of said support bar to a base.

2. The fishing pole holder according to claim 1, wherein said first end of said plurality of clamps includes a closed end aligned with said indicator attached to the first surface of the at least one panel member.

3. The fishing pole holder according to claim 1, wherein said second end of said plurality of clamps includes a hook end.

4. The fishing pole holder according to claim 1, wherein said horizontal member of said support bar includes at least one joint member.

5. The fishing pole holder according to claim 1, wherein said vertical member of said support bar includes a joint member having a screw fastener attached for adjustment.

6. The fishing pole holder according to claim 1, wherein said vertical member of said support bar includes a detachable joint member for detaching said vertical member into separate components.

7. The fishing pole holder according to claim 1, wherein said vertical member and said horizontal member are connected to form a T-shaped member.

8. The fishing pole holder of claim 7, wherein said vertical member of said support bar includes a tilt mechanism to allow said support bar to be adjusted to an angle between 0 and 180 degrees.

9. The fishing pole holder according to claim 1, wherein said plurality of clamps are detachably connected to said horizontal member of said support bar.

10. The fishing pole holder of claim 1, wherein said plurality of clamps include a longitudinal channel extending between said first end and second end of said plurality of clamps.

11. The fishing pole holder according to claim 10, wherein said plurality of clamps are attached to said horizontal member utilizing said longitudinal channel to allow each of the plurality of clamps comprising a hook end to be aligned with said indicator attached to the first surface of the at least one panel member.

12. The fishing pole holder of claim 1, wherein in said plurality of clamps are rotatable about an axis along said support bar to provide for adjustment of said plurality of clamps.

13. The fishing pole holder of claim 12, wherein said plurality of clamps include a bolt having an axis to allow said clamps to be rotatable at an angle between 0 and 360 Degrees.

14. The fishing pole holder of claim 1, wherein said support bar is composed of a material chosen from the group of materials consisting of wood, plastic, particle board and metal.

15. The fishing pole holder of claim 1, wherein said indicator comprises an audible alarm.

16. The fishing pole holder of claim 1, wherein said indicator comprises a visual alarm.

17. The fishing pole holder of claim 1, wherein said attachment member is chosen from the group consisting of a clamp, stand or pole.

18. A fishing pole holder comprising:
   a collapsible support bar having a vertical member and a horizontal member a plurality of clamps attached to horizontal member, wherein said clamps include a first end and a second end to receive a handle of a fishing pole;
   at least one panel member attached to said horizontal member, wherein the at least one panel member coma rises a sheet of material having a first surface and an opposite surface extending in a parallel plane proximal to at least one end of the plurality of clamps, wherein an indicator means for indicating to a user that a fish is attached to a line of fishing pole, is attached to the first surface of the at least one panel member proximal to the at least one end of the plurality of clamps said plurality of clamps adapted to receive and support the fishing pole, to provide notification to a user of a fish secured to said fishing pole said indicator means comprising visual alarm or audio alarm;
   a connection structure for attaching said vertical member to said horizontal member of said support bar; and
   an attachment member for removably attaching said vertical member of said support bar to a base.

* * * * *